United States Patent
Wang et al.

(10) Patent No.: US 9,706,532 B2
(45) Date of Patent: Jul. 11, 2017

(54) TDD AND FDD JOINT CARRIER AGGREGATION ENHANCEMENTS IN LTE-ADVANCED

(71) Applicant: BlackBerry Limited, Waterloo (CA)

(72) Inventors: Yiping Wang, Allen, TX (US); Zhijun Cai, Herndon, VA (US); Yi Song, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 113 days.

(21) Appl. No.: 14/187,157

(22) Filed: Feb. 21, 2014

(65) Prior Publication Data

US 2015/0245343 A1    Aug. 27, 2015

(51) Int. Cl.
| | |
|---|---|
| *H04W 72/04* | (2009.01) |
| *H04L 1/18* | (2006.01) |
| *H04L 5/00* | (2006.01) |
| *H04L 5/14* | (2006.01) |

(52) U.S. Cl.
CPC ....... *H04W 72/0413* (2013.01); *H04L 1/1854* (2013.01); *H04L 1/1861* (2013.01); *H04L 5/001* (2013.01); *H04L 5/0055* (2013.01); *H04L 5/14* (2013.01)

(58) Field of Classification Search
CPC .. H04W 72/14; H04W 76/025; H04L 5/0055; H04L 1/18; H04L 5/14; H04L 5/0098; H04L 5/001
See application file for complete search history.

(56) References Cited

U.S. PATENT DOCUMENTS

| | | | |
|---|---|---|---|
| 2010/0272019 A1 | 10/2010 | Papasakellariou et al. | |
| 2012/0002593 A1* | 1/2012 | Kim | H04L 1/1854 370/315 |
| 2012/0046032 A1 | 2/2012 | Baldemair et al. | |
| 2014/0029559 A1 | 1/2014 | Seo et al. | |
| 2014/0036856 A1 | 2/2014 | Park | |
| 2015/0003302 A1* | 1/2015 | Ekpenyong | 370/280 |
| 2015/0085711 A1 | 3/2015 | Wang et al. | |

(Continued)

OTHER PUBLICATIONS

3GPP TS 36.211 V11.3.0 (Jun. 2013), "Evolved Universal Terrestrial Radio Access (E-UTRA); Physical Channels and Modulation" Release 11.

(Continued)

*Primary Examiner* — Faruk Hamza
*Assistant Examiner* — Aixa Guadalupe-Cruz
(74) *Attorney, Agent, or Firm* — Fish & Richardson P.C.

(57) ABSTRACT

In some implementations, a method in a user equipment (UE) for supporting time division duplex (TDD) and frequency division duplex (FDD) joint carrier aggregation (CA) includes receiving a Physical Uplink Control Channel (PUCCH) resource allocation from an evolved NodeB (eNB). The PUCCH resource allocation includes a first PUCCH configuration for a first subframe and a second PUCCH configuration for a second subframe, and the second PUCCH configuration is different than the first PUCCH configuration. The UE transmits a first group of Hybrid Automatic Repeat reQuest (HARQ) bits based on the first PUCCH configuration in the first subframe. The UE transmits a second group of HARQ bits based on the second PUCCH configuration in the second subframe.

11 Claims, 11 Drawing Sheets

(56) References Cited

U.S. PATENT DOCUMENTS

| | | | | |
|---|---|---|---|---|
| 2015/0146588 A1* | 5/2015 | Park | ................. | H04L 1/1854 370/280 |
| 2015/0341923 A1* | 11/2015 | Yang | ................. | H04W 72/04 370/329 |
| 2016/0249345 A1* | 8/2016 | Takeda | ................. | H04L 1/18 |
| 2016/0270060 A1* | 9/2016 | Kusashima | ......... | H04L 1/1854 |

OTHER PUBLICATIONS

3GPP TS 36.213 V11.3.0 (Jun. 2013), "Evolved Universal Terrestrial Radio Access (E-UTRA); Physical layer procedures". Release 11.

Nokia Corporation, Nokia Siemens Networks; "New Wi: LTE TDD—FDD Joint Operation"; RP-130888; Meeting #60; Oranjestad, Aruba, Jun. 11-14, 2013.

International Search Report and Written Opinion in International Application No. PCT/US2015/016782, dated Jul. 8, 2015, 13 pages.

International Preliminary Report on Patentability in International Application No. PCT/US2015/016782, dated May 27, 2016.

* cited by examiner

```
-- ASN1START

PUCCH-ConfigDedicated ::=           SEQUENCE {
    ackNackRepetition                   CHOICE{
        release                             NULL,
        setup                               SEQUENCE {
            repetitionFactor                    ENUMERATED {n2, n4, n6, spare1},
            n1PUCCH-AN-Rep                      INTEGER (0..2047)
        }
    },
    tdd-AckNackFeedbackMode             ENUMERATED {bundling, multiplexing}      OPTIONAL    -- Cond TDD
}

PUCCH-ConfigDedicated-v1020 ::=     SEQUENCE {
    pucch-Format-r10                    CHOICE {
        format3-r10                         SEQUENCE {
            n3PUCCH-AN-List-r10                 SEQUENCE (SIZE (1..4)) OF INTEGER (0..549)
            twoAntennaPortActivatedPUCCH-Format3-r10    CHOICE {
                release                             NULL,
                setup                               SEQUENCE {
                    n3PUCCH-AN-ListP1-r10               SEQUENCE (SIZE (1..4)) OF INTEGER (0..549)
                }
            }                                                                   OPTIONAL    -- Need ON
        },
        channelSelection-r10                SEQUENCE {
            n1PUCCH-AN-CS-r10                   CHOICE {
                release                             NULL,
                setup                               SEQUENCE {
                    n1PUCCH-AN-CS-List-r10              SEQUENCE (SIZE (1..2)) OF N1PUCCH-AN-CS-r10
                }
            }                                                                   OPTIONAL    -- Need ON
        }
```

FROM FIG. 4A

```
    }                                                        OPTIONAL   -- Need ON
  }
  twoAntennaPortActivatedPUCCH-Format1a1b-r10  ENUMERATED {true}  OPTIONAL,  -- Need OR
  simultaneousPUCCH-PUSCH-r10                  ENUMERATED {true}  OPTIONAL,  -- Need OR
  n1PUCCH-AN-RepP1-r10                         INTEGER (0..2047)  OPTIONAL,  -- Need OR
                                                                  OPTIONAL   -- Need OR
}

PUCCH-ConfigDedicated-v1130 ::=  SEQUENCE {
  n1PUCCH-AN-CS-v1130            CHOICE {
    release                         NULL,
    setup                           SEQUENCE {
      n1PUCCH-AN-CS-ListP1-r11        SEQUENCE (SIZE (2..4)) OF INTEGER (0..2047)
    }
                                                             OPTIONAL,  -- Need ON
  }
  nPUCCH-Param-r11               CHOICE {
    release                         NULL,
    setup                           SEQUENCE {
      nPUCCH-Identity-r11             INTEGER (0..503),
      n1PUCCH-AN-r11                  INTEGER (0..2047)
    }
                                                             OPTIONAL   -- Need ON
  }
}

PUCCH-ConfigDedicated-v13 ::=  SEQUENCE {
  PUCCHFormat3Bitmap             BIT STRING (SIZE (6)),  ⎫
                                                         ⎬ 402
}                                                        ⎭

N1PUCCH-AN-CS-r10 ::= SEQUENCE (SIZE (1..4)) OF INTEGER (0..2047)

-- ASN1STOP
```

```
-- ASN1START
PUCCH-ConfigCommon ::=       SEQUENCE {
    deltaPUCCH-Shift         ENUMERATED {ds1, ds2, ds3},
    nRB-CQI                  INTEGER (0..98),
    nCS-AN                   INTEGER (0..7),
    n1PUCCH-AN               INTEGER (0..2047)
}
PUCCH-ConfigComm-v12 ::=     SEQUENCE {
    nRB-CQI-para-r12         CHOICE {
        release                  NULL,
        setup                    SEQUENCE {
            nRB-CQI-r12              INTEGER (0..98),
            nRB-CQI-Subframes        BIT STRING (SIZE (10)),
        }
    }                                                           OPTIONAL,   -- Need ON
}
-- ASN1STOP
```

| nRB-CQI-r12 | THE ADDITIONAL $N_{RB}^{(2)}$ |
|---|---|
| nRB-CQI-SUBFRAMES | THE SUBFRAMES WHICH nRB-CQI-r12 APPLIES TO |

TDD AND FDD JOINT CARRIER AGGREGATION ENHANCEMENTS IN LTE-ADVANCED

TECHNICAL FIELD

This disclosure relates to data transmission in communication systems and, more specifically, to methods and systems for supporting time division duplex (TDD) and frequency division duplex (FDD) joint carrier aggregation.

BACKGROUND

In wireless communication systems, such as third generation partnership project (3GPP) long term evolution (LTE) systems, downlink and uplink transmissions may be organized into two duplex modes: frequency division duplex (FDD) mode and time division duplex (TDD) mode. The FDD mode uses a paired spectrum where the frequency domain is used to separate the uplink (UL) and the downlink (DL) transmissions. The TDD mode, on the other hand, uses a common spectrum and relies on the time multiplexing to separate the UL and the DL transmissions.

In wireless communication systems, such as LTE systems, a User Equipment (UE) may transmit Hybrid Automatic Repeat reQuest (HARQ) bits in response to Physical Downlink Shared Channel (PDSCH) transmissions received on the DL. A HARQ bit may be an acknowledge (ACK), which signals successful receipt of data. A HARQ bit may also be a negative acknowledgement (NACK), which signals that data was not received successfully. A UE may transmit HARQ bits on a Physical Uplink Control Channel (PUCCH).

In LTE-advanced (LTE-A) systems, carrier aggregation (CA) enables multiple component carriers (CCs), which use up to 20 MHz bandwidth each, to be aggregated to form a wider total bandwidth. To support CA, a LTE-A UE may simultaneously receive or transmit on one or multiple CCs. These multiple CCs may be from the same evolved NodeB (eNB) or from difference eNBs. In a FDD system, the number of CCs aggregated in the DL may be different from the CCs in the UL and the bandwidths configured for the UL may also be different from the bandwidths for the DL.

For CA, a UE may have one independent HARQ entity per CC and in each of uplink or downlink. Each UE may have one Radio Resource Control (RRC) connection with the network. The serving cell handling RRC connection establishment/re-establishment/handover is referred to as the Primary Cell (PCell). The carrier corresponding to the PCell is termed the primary component carrier (PCC). Other serving cells are referred to as secondary cells (SCells) and their corresponding carriers are referred to as secondary component carriers (SCC). The carriers could be aggregated intra-band and/or inter-band.

DETAILED DESCRIPTION

Figure 1:
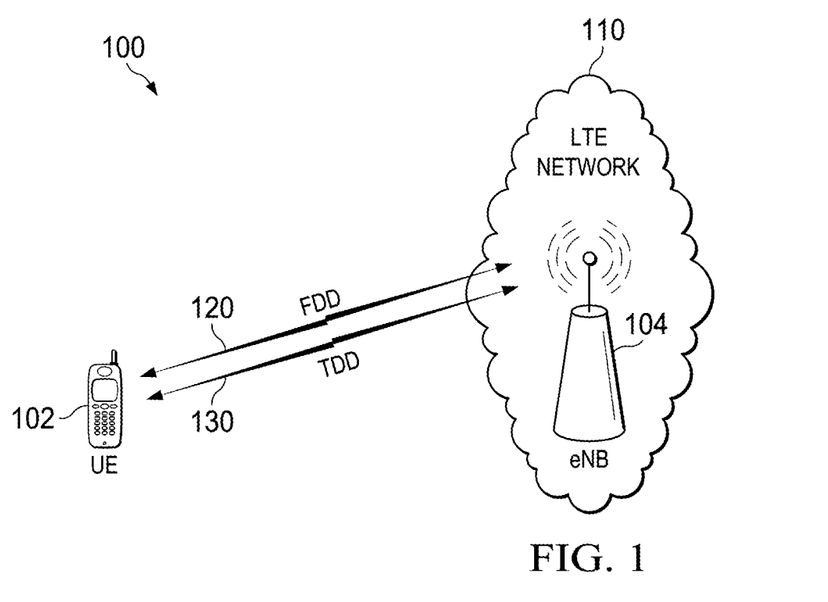
FIG. 1 is an example mobile communication system supporting TDD-FDD joint CA.

FIG. 1 is an example mobile communication system 100 that supports TDD-FDD joint CA. For example, in a mobile communication system, a UE may receive a PUCCH resource allocation from an eNB. The eNB may transmit the PUCCH resource allocation in a RRC message. The PUCCH resource allocation may include a first PUCCH configuration for a first subframe and a second PUCCH configuration for a second subframe, and the second PUCCH configuration is different than the first PUCCH configuration. The UE may transmit a first group of HARQ bits based on the first PUCCH configuration in the first subframe and transmit a second group of HARQ bits based on the second PUCCH configuration.

In some implementations, the first group of HARQ bits include one or more HARQ bits corresponding to PDSCH transmissions on a TDD carrier and one or more HARQ bits corresponding to PDSCH transmissions on a FDD carrier. In some implementations, the first PUCCH configuration indicates a first PUCCH format, and the second PUCCH configuration indicates a second PUCCH format. In some implementations, the first PUCCH format may be PUCCH format 3. In some implementations, the PUCCH resource allocation is a bitmap. The bitmap may indicate a PUCCH format for each subframe in a radio frame. In some implementations, the UE may transmit the first group of HARQ bits in a resource block that is between resource blocks used to transmit PUCCH format 1 and resource blocks used to transmit Physical Uplink Shared Channel (PUSCH). In some implementations, the UE may receive a resource block allocation from the eNB. The resource block allocation may include a first parameter and a second parameter that is different than the first parameter. The UE may transmit the first group of HARQ bits based on the first parameter, and transmit the second group of HARQ bits based on the second parameter.

In some implementations, a UE may identify a plurality of subgroups of HARQ bits in the first group of HARQ bits. The UE may identify a plurality of PUCCH resources for the plurality of subgroups of HARQ bits. In some implementations, the plurality of PUCCH resources is consecutive. The UE may transmit the first group of HARQ bits based on the plurality of PUCCH resources.

In some implementations, a UE may receive a TDD-FDD joint CA configuration from an eNB. The TDD-FDD joint CA configuration may include a FDD carrier as a PCell and a TDD carrier as a SCell. The UE may receive a PDSCH on the TDD carrier. The UE may transmit a HARQ bit corresponding to the received PDSCH based on a FDD HARQ timing. In some implementations, the UE receives a PDSCH assignment for the TDD carrier on the TDD carrier. In some implementations, the UE receives a PDSCH assignment for the TDD carrier on the FDD carrier In some implementations, an eNB configures a TDD-FDD joint CA, which includes a TDD carrier and a FDD carrier. The eNB may use only the FDD carrier to configure a PCell. In some implementations, the eNB may use a TDD carrier to configure a PCell, and transmits scheduling assignments for the TDD carrier only on the TDD carrier.

Transmitting HARQ bits according to methods and systems described herein may provide one or more advantages. This approach may improve system performance by increasing throughput and reducing latency. For example, an eNB may allocate PUCCH format 3 flexibly to allow more HARQ ACK/NACK opportunities when needed without causing backward compatible problems for legacy UEs. Furthermore, a flexible allocation of PUCCH resources may allow efficient use of PUCCH resources. In addition, improvements on HARQ timing may reduce the round trip time for PDSCH transmissions on the TDD carrier.

At a high level, the example mobile communication system 100 includes a UE 102, a LTE or LTE-A network 110, which includes an eNB 104 that is communicably coupled with the UE 102. The UE 102 receives a TDD-FDD joint CA configuration from the eNB 104. The TDD-FDD joint CA configuration includes a FDD carrier 120 and a TDD carrier 130. In some instances, the UE 102 receives a PUCCH resource allocation from the eNB 104. The PUCCH resource allocation includes a first PUCCH configuration for a first subframe and a second PUCCH configuration for a second subframe that is different than the first PUCCH configuration. The UE transmits a first group of HARQ bits based on the first PUCCH configuration in the first subframe. The UE transmits a second group of HARQ bits based on the second PUCCH configuration in the second subframe. In some implementations, the first group of HARQ bits includes one or more HARQ bits corresponding to PDSCH transmission on the FDD carrier 120 and one or more HARQ bits corresponding to PDSCH transmissions on the TDD carrier 130. FIGS. 2-9 and associated descriptions provide additional details of these implementations.

Figure 10:
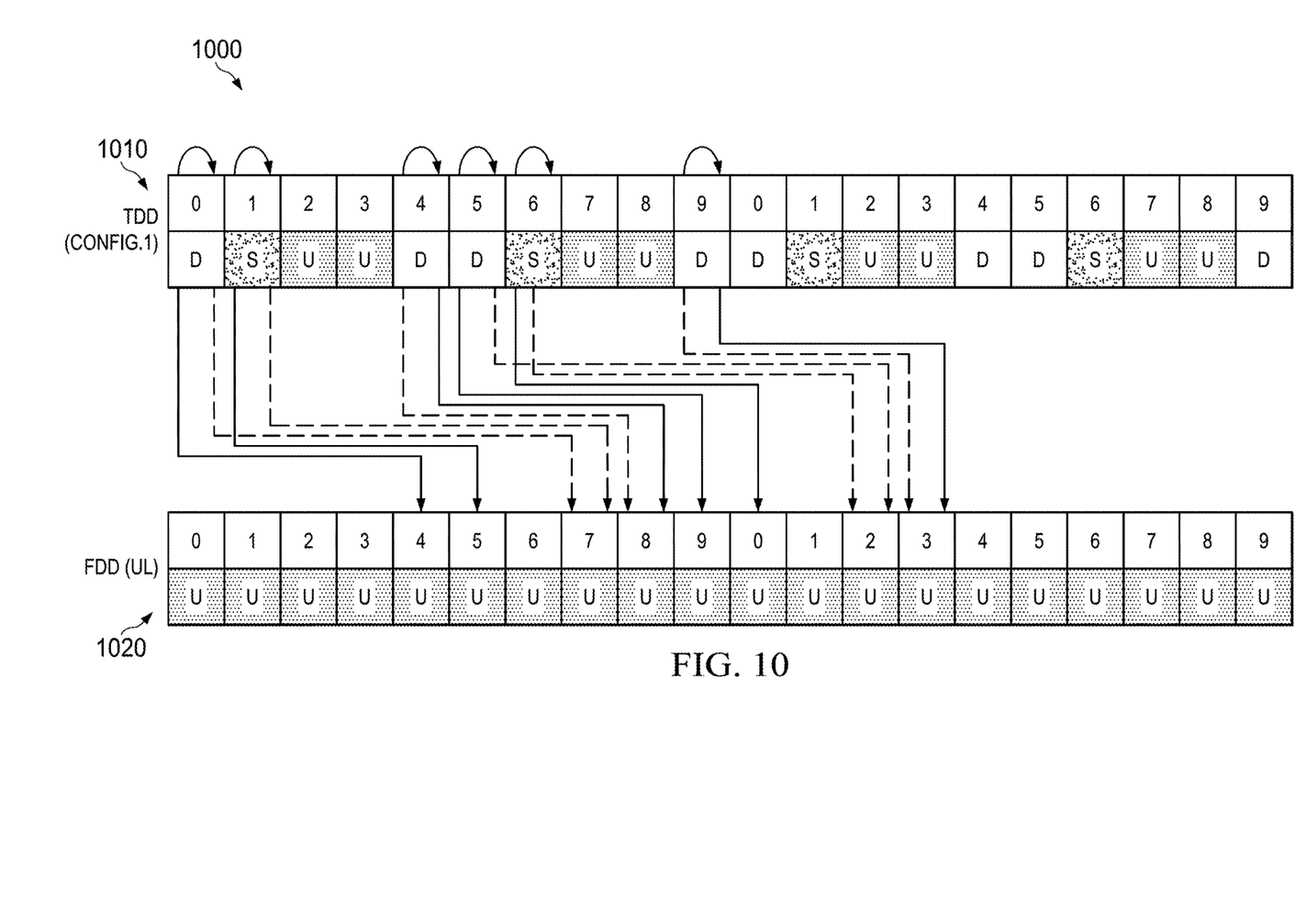
FIG. 10 is an example HARQ timing relationship on a TDD carrier with self-scheduling.
Figure 11:
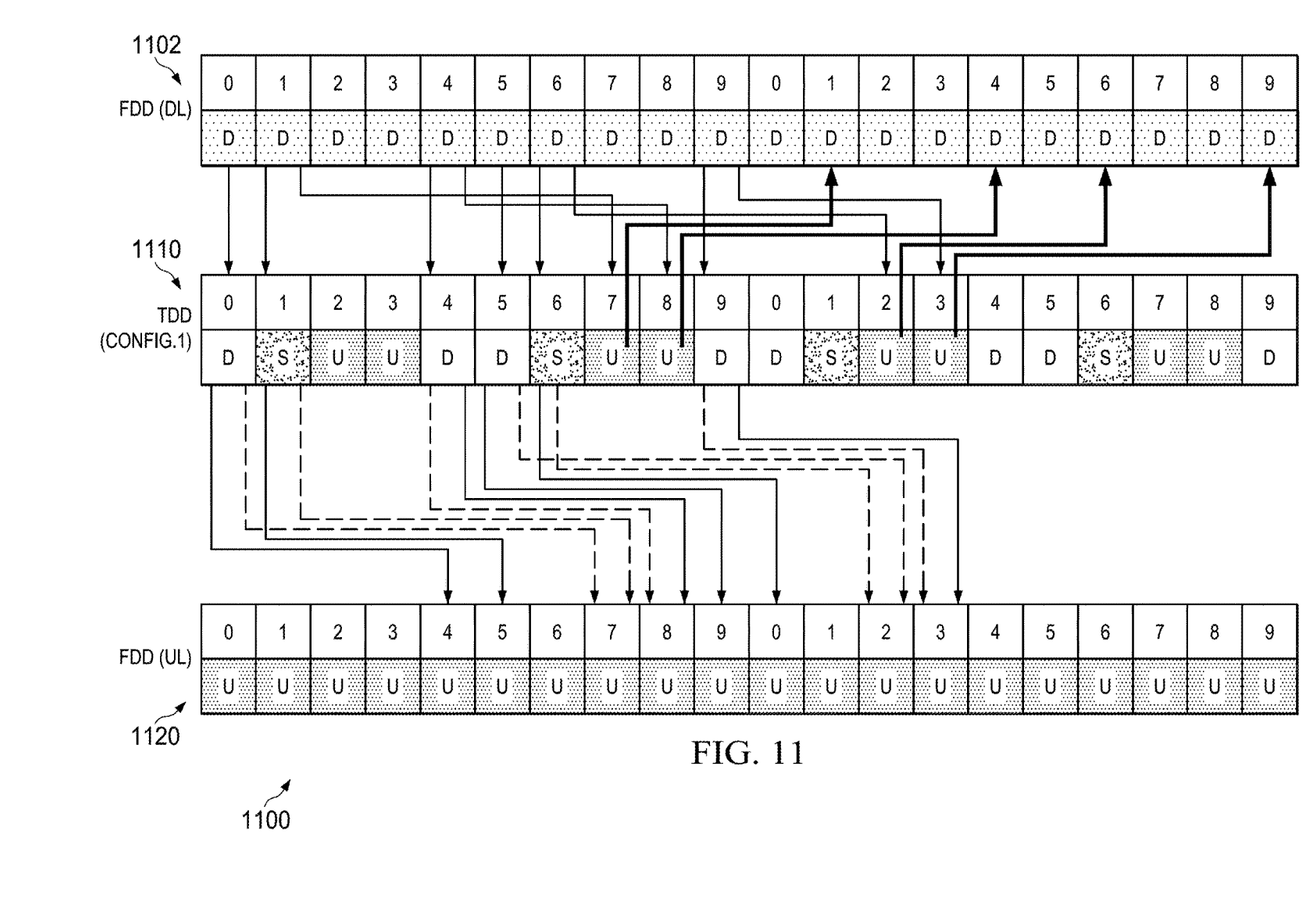
FIG. 11 is an example HARQ timing relationship on a TDD carrier with cross-carrier scheduling.
Figure 12:
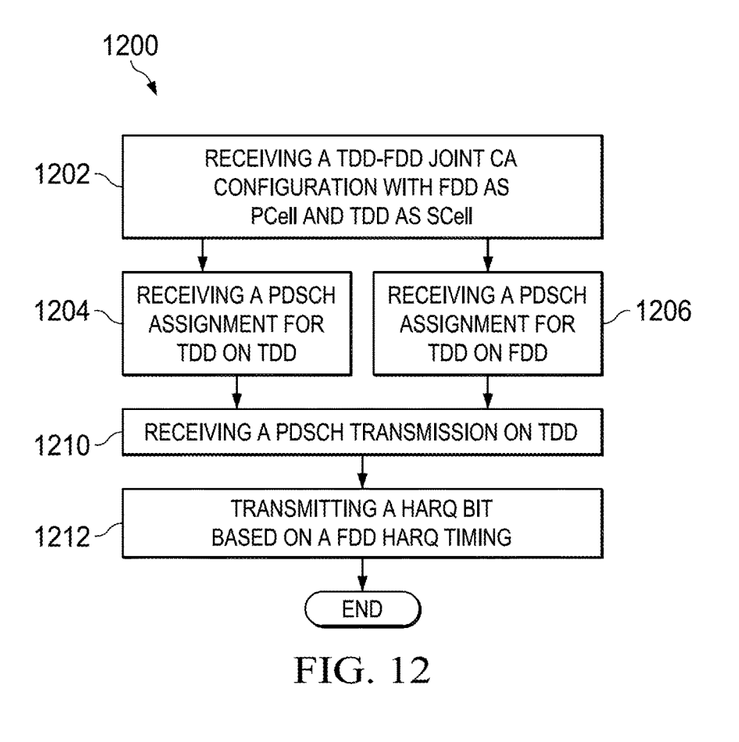
FIG. 12 is a flowchart illustrating a method for supporting TDD-FDD joint CA, according to one example of principles described herein.
Figure 13:
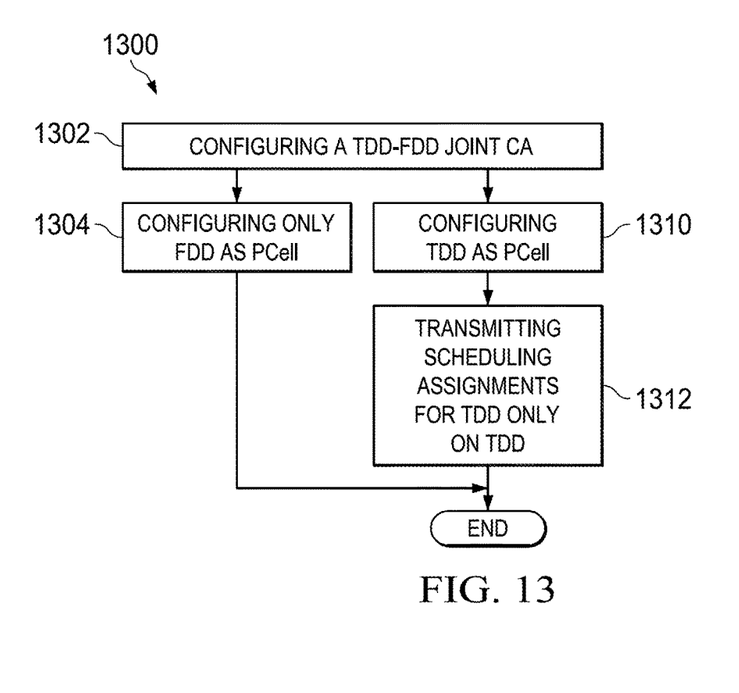
FIG. 13 is a flowchart illustrating a method for supporting TDD-FDD joint CA, according to one example of principles described herein.

In some instances, the eNB 104 configures the FDD carrier 120 as a PCell and the TDD carrier 130 as a SCell. The UE 102 receives a PDSCH on the TDD carrier 130. The UE 102 transmits a HARQ bit corresponding to the received PDSCH based on a FDD HARQ timing. FIGS. 10-12 and associated descriptions provide additional details of these implementations. In some instances, the eNB 104 configures a PCell using only the FDD carrier 120. In some instances, the eNB 104 configures a PCell using the TDD carrier 130 and then transmits scheduling assignments for the TDD carrier 130 only on the TDD carrier 130. FIG. 13 and associated descriptions provide additional details of these implementations.

Turing to a general description of the elements, the UE 102 may be referred to as mobile electronic device, user device, mobile station, subscriber station, portable electronic device, mobile communications device, wireless modem, or wireless terminal. Examples of a UE (e.g., the UE 102) may include a cellular phone, personal data assistant (PDA), smart phone, laptop, tablet personal computer (PC), pager, portable computer, portable gaming device, wearable electronic device, or other mobile communications device having components for communicating voice or data via a mobile communication network.

Other examples of a UE include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The UE 102 may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "UE" can also refer to any hardware or software component that can terminate a communication session for a user. In addition, the terms "user equipment," "UE," "user equipment device," "user agent," "UA," "user device," and "mobile device" can be used synonymously herein.

A radio access network (RAN) is part of a mobile telecommunication system which implements a radio access technology, such as UMTS, CDMA2000 and 3GPP LTE/LTE-A. In many applications, a RAN includes at least one eNB 104. An eNB (e.g., the eNB 104) can be a radio base station that may control all or at least some radio related functions in a fixed part of the system. The at least one eNB 104 can provide radio interface within their coverage area or a cell for UEs 102 to communicate. eNBs 104 may be distributed throughout the cellular network to provide a wide area of coverage. The eNB 104 directly communicates to one or a plurality of UEs 102, other eNBs, and one or more core network nodes.

The LTE network 110 may include one or a plurality of radio access networks, core networks (CNs), and external networks. In certain implementations, the radio access networks may be Evolved Universal Mobile Telecommunications System (UMTS) terrestrial radio access networks (EUTRANs). In addition, in certain instances, core networks may be evolved packet cores (EPCs). In some implementations, 2G/3G systems, e.g., Global System for Mobile communication (GSM), Interim Standard 95 (IS-95), Universal Mobile Telecommunications System (UMTS) and CDMA2000 (Code Division Multiple Access) may also be integrated into the LTE network 110.

Though described in terms of FIG. 1, the present disclosure is not limited to such an environment. In general, mobile communication systems may be described as cellular networks made up of a number of radio cells, or cells that are each served by a base station or other fixed transceiver. The cells are used to cover different areas in order to provide radio coverage over an area. Example mobile communication systems include Global System for Mobile Communication (GSM) protocols, Universal Mobile Telecommunications System (UMTS), 3GPP Long Term Evolution (LTE), and others. In addition to mobile communication systems, wireless broadband communication systems may also be suitable for the various implementations described in the present disclosure. Example wireless broadband communication system includes IEEE 802.11 wireless local area network, IEEE 802.16 WiMAX network, etc.

Figure 2:
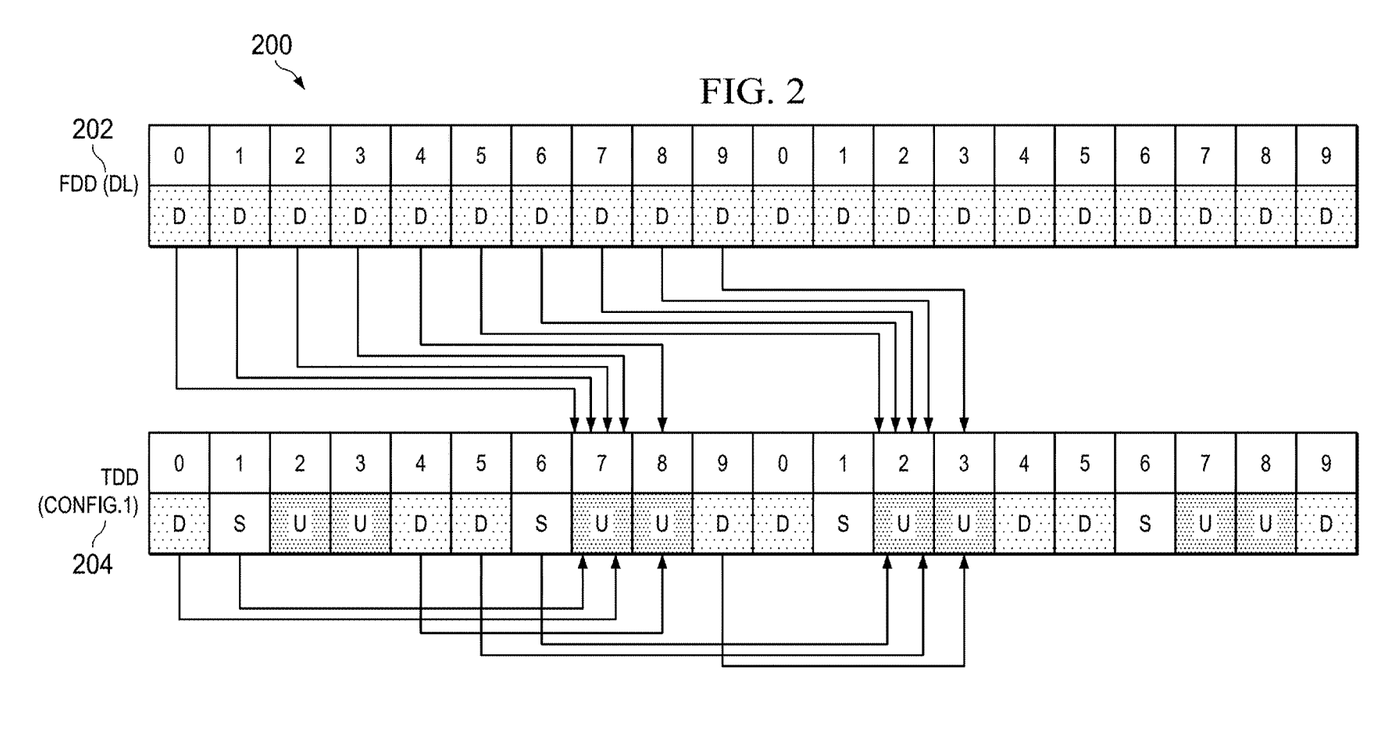
FIG. 2 is an example HARQ timing relationship in TDD-FDD joint CA.

FIG. 2 is a schematic 200 illustrating an example HARQ timing relationship in TDD-FDD joint CA. The example HARQ timing relationship includes an example HARQ timing relationship for PDSCH transmission on a FDD carrier 202, and an example HARQ timing relationship for PDSCH transmission on a TDD carrier 204. In a 3GPP LTE TDD system, a subframe of a radio frame can be a downlink, an uplink or a special subframe. The special subframe comprises downlink and uplink time regions separated by a guard period for downlink to uplink switching. The 3GPP specification standards define seven different UL/DL configuration schemes for LTE TDD operations. These schemes are listed in Table 1. D represents downlink subframes, U represents uplink subframes and S represents the special subframe. The special subframe includes three parts, (1) the downlink pilot time slot (DwPTS), (2) the uplink pilot time slot (UpPTS) and (3) the guard period (GP). Downlink transmissions on the PDSCH may be made in DL subframes or in the DwPTS portion of a special subframe. The table below illustrates LTE TDD uplink-downlink configurations.

TABLE 1

UL-DL Configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As Table 1 shows, there are two switching point periodicities specified in the LTE standard: 5 ms and 10 ms. The 5 ms switching point periodicity is introduced to support the co-existence between LTE and low chip rate UTRA TDD systems and the 10 ms switching point periodicity is introduced to support the co-existence between LTE and high chip rate UTRA TDD systems. The supported configurations cover a wide range of UL/DL allocations from a DL heavy 1:9 ratio to a UL heavy 3:2 ratio. The DL allocations in these ratios include both DL subframes and special subframes, which can also carry downlink transmissions in DwPTS. Therefore, compared to FDD systems, TDD systems have more flexibility in terms of the proportion of resources assignable to uplink and downlink communications within a given assignment of spectrum. Specifically, it is possible to distribute the radio resources unevenly between uplink and downlink. This will provide a way to utilize the radio resources more efficiently by selecting an appropriate UL/DL configuration based on interference situation and different traffic characteristics in DL and UL.

Because the UL and DL transmissions are not continuous (i.e. UL or DL transmissions may not occur in every subframe) in a LTE TDD system, the scheduling and HARQ timing relationships are separately defined in the specifications. An example HARQ timing relationship for the downlink is shown below in Table 2. The example HARQ timing relationship associates an UL subframe n, which conveys ACK/NACK, with DL subframes n-ki, i=0 to M-1. The set of DL subframes for which ACK/NACK is provided is referred to herein as the bundling window, and the number of subframes for which ACK/NACK is provided, M, is referred to as the bundling window size.

The uplink HARQ timing linkage is shown in Table 3 below. The table indicates that the Physical Hybrid Indicator Channel (PHICH) ACK/NACK received in the DL subframe i is linked with the UL data transmission in the UL subframe i-k, k being given in Table 2. In addition, for UL/DL configuration 0, in subframes 0 and 5, $I_{PHICH}=1$ and k=6. This is because there may be two ACK/NACKs for a UE transmitted on the PHICH in subframes 0 and 5, one is represented by $I_{PHICH}=1$, the other is $I_{PHICH}=0$. $I_{PHICH}$ just serves as an index.

TABLE 3 k for HARQ ACK/NACK

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | | 7 | 4 | | 6 |

The UL grant, HARQ and transmission/retransmission relationship is shown below in Table 4. Upon detection of a PDCCH with DCI format 0 and/or a PHICH transmission in subframe n intended for the UE, the UE may adjust the corresponding PUSCH transmission in subframe n+k, with k given in Table 4. For TDD UL/DL configuration 0, if the

TABLE 2

Downlink association set index K: $\{k_0, k_1, \ldots k_{M-1}\}$

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — | least significant bit (LSB) of the UL index in the DCI format 0 is set to 1 in subframe n or a PHICH is received in subframe n=0 or 5 in the resource corresponding to $I_{PHICH}=1$, or PHICH is received in subframe n=1 or 6, the UE may adjust the corresponding PUSCH transmission in subframe n+7. If, for TDD UL/DL configuration 0, both the most significant bit (MSB) and LSB of the UL index in the DCI format 0 are set in subframe n, the UE may adjust the corresponding PUSCH transmission in both subframes n+k and n+7, with k given in Table 4.

TABLE 4 k for PUSCH transmission

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

In the illustrated example, the TDD carrier 204 uses UL/DL configuration 1. The TDD carrier 204 uses subframe 7 to transmit HARQ bits corresponding to the received PDSCHs on the TDD carrier 204 in subframe 0 and subframe 1. The TDD carrier 204 uses subframe 8 to transmit HARQ bits corresponding to the received PDSCHs on the TDD carrier 204 in subframe 4.

In the illustrated example, the TDD carrier 204 is configured as a PCell. A UE may therefore use the TDD carrier 204 to transmit HARQ bits corresponding to PDSCH transmissions on the FDD carrier 202. In some instances, the FDD carrier 202 has a HARQ timing relationship of 4, which means that a UE may transmit a HARQ bit in subframe n corresponding to PDSCH transmissions on the FDD carrier 202 in subframe n−4. In the illustrated example, when the UE receives a PDSCH transmission on the FDD carrier 202 in subframe 0, the earliest time that the UE may transmit a corresponding HARQ bit is in subframe 4. This delay can give the receiver time to processing the received data block and generate the corresponding ACK/NACK. However in the illustrated example, because the TDD carrier 204 uses UL/DL configuration 1, subframe 4 is a DL subframe. For UL/DL configuration 1, subframe 5 is also a DL subframe, and subframe 6 is a special frame. Therefore, for a PDSCH received in subframe 0 on the FDD carrier 202, the UE may transmit a corresponding HARQ bit in subframe 7, which is a UL subframe. The UE may also transmit HARQ bits corresponding to subframes 1, 2, and 3 on the FDD carrier 202 in subframe 7 on the TDD carrier 204. In another alternative, the relationship on the TDD UL subframe to transmit the HARQ bit for a particular FDD DL subframe may be specified in the standards or pre-configured by the eNB.

In the illustrated example, the UE may therefore transmit up to six HARQ bits in subframe 7 on the TDD carrier 204. Two of the six HARQ bits correspond to PDSCH transmissions on the TDD carrier 204 in subframe 0 and 1, and the remaining four HARQ bits correspond to PDSCH transmissions on the FDD carrier 202 in subframe 0, 1, 2, and 3, respectively. The UE may also transmit up to six HARQ bits in subframe 2 on the TDD carrier 204. The UE may transmit more HARQ bits if it receives PDSCH transmissions in multiple layers. On the other hand, the UE may transmit up to two HARQ bits in subframe 8 on the TDD carrier 204. One of the two HARQ bits corresponds to PDSCH transmissions on the TDD carrier 204 in subframe 4, and the other HARQ bit corresponds to PDSCH transmissions on the FDD carrier 202 in subframe 4.

In some implementations, an eNB may configure a flexible PUCCH resource allocation. For example, a UE may receive a PUCCH resource allocation from an eNB. The resource allocation may include two PUCCH configurations. The UE may use one PUCCH configuration to transmit HARQ bits on PUCCH in one subframe, and use the other PUCCH configuration to transmit HARQ bits on PUCCH in another subframe. This approach may enable PUCCH resource allocation on a subframe basis and improve the radio resource utilization efficiency. For example, one PUCCH configuration may indicate a PUCCH format and the other PUCCH configuration may indicate another PUCCH format. In a LTE system, a UE may use PUCCH format 1 or format 3 to transmit HARQ bits. PUCCH format 3 may transmit more HARQ bits than PUCCH format 1, but PUCCH format 3 may also occupy more resources. In the illustrated example, the eNB may configure the UE to use PUCCH format 3 in subframes 2 and 7 because the UE may need to transmit more HARQ bits in these subframes. On the other hand, the eNB may configure the UE to use PUCCH format 1 in subframes 3 and 8, and thereby save resources in these subframes.

The eNB may transmit the PUCCH resource allocation using higher layer signaling. For example, the eNB may transmit the PUCCH resource allocation in a RRC message. The UE may also indicate whether it supports flexible PUCCH resource allocation using a Feature Group Indicator (FGI). For example, the UE may set the FGI bit to '1' to indicate that it supports a PUCCH resource allocation that includes more than one PUCCH configurations. Conversely, the UE may set the FGI bit to '0' to indicate that it does not support a PUCCH resource allocation that includes more than one PUCCH configurations. In another example, the eNB may transmit the allocation in a MAC control elements.

Figure 3:
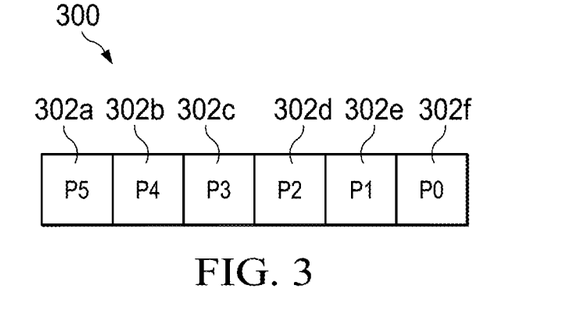
FIG. 3 is an example bitmap for a PUCCH resource allocation.

FIG. 3 is a schematic illustrating an example bitmap 300 for a PUCCH resource allocation. The bitmap 300 includes bit P5 302a, P4 302b, P3 302C, P2 302d, P1 302e, and P0 302f. In some implementations, an eNB may use a bitmap which has the same number of bits as the maximum number of UL subframes in TDD UL/DL configurations. For example, as shown in Table 1, the maximum number of UL subframes in TDD UL/DL configurations 0-6 is six. An eNB therefore may use a bitmap with 6 bits. In the illustrated example, each bit in the bitmap 300 indicates a PUCCH configuration for one UL subframe. For example, each bit in the bitmap 300 may indicate whether the UE may use format 3 to transmit HARQ bits in the respective subframe. For example, if the UE uses TDD UL/DL configuration 0, then the UE may transmit HARQ bits in subframe 2, 3, 4, 7, 8, and 9. The eNB may set bit P5 302a to "1," which indicates that the UE may use PUCCH format 3 to transmit HARQ bits in subframe 2. The eNB may set bit P4 302b to "0," which indicates that the UE may use PUCCH format 1 in subframe 3. In some implementations, if the UE uses TDD UL/DL configuration that has m UL subframes, where m<6, the eNB may use a m-bit bitmap instead of a 6-bit bitmap to indicate the PUCCH resource allocation. In one alternative, to be simple, the m could be set to the maximum number of UL subframes of all possible TDD configurations. In some implementations, the eNB may use a 6-bit bitmap and use either the left most m bits or the right most m bits in the bitmap to indicate the PUCCH resource allocation.

Figure 4A:
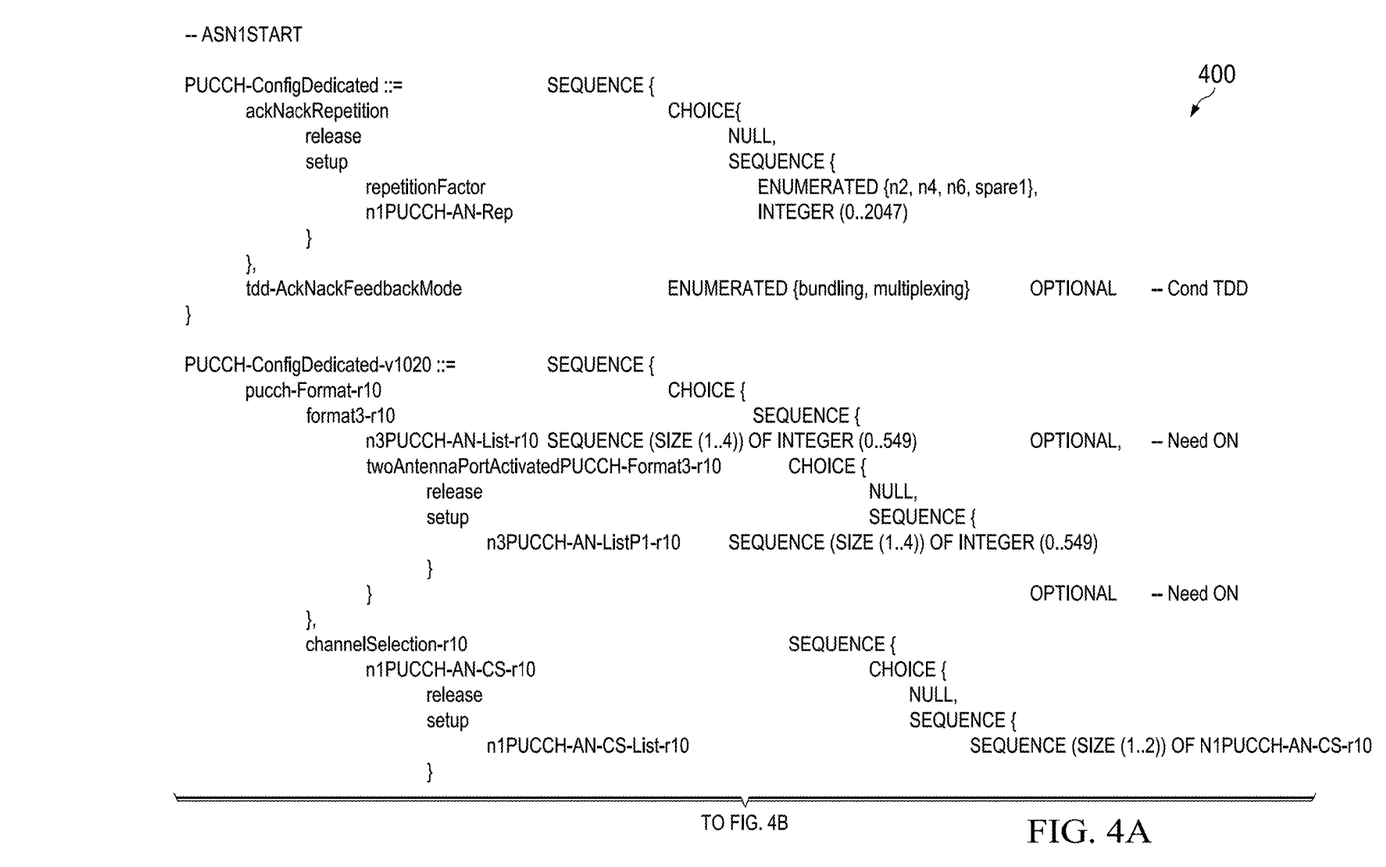
FIGS. 4A-4B are an example information element definition for a PUCCH resource allocation.
Figure 4B:
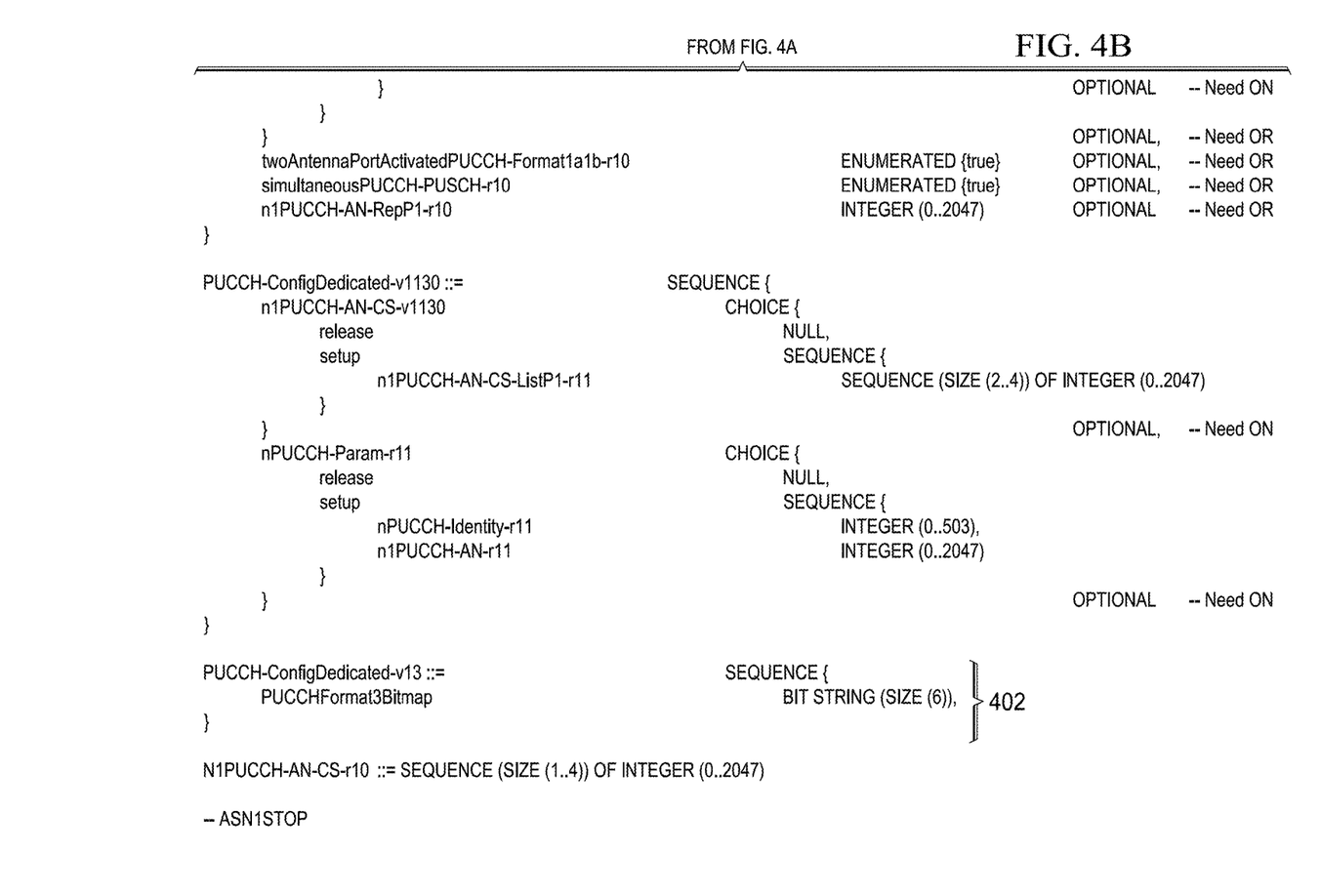

FIGS. 4A-4B are an example information element definition 400 for a PUCCH resource allocation. The example information element definition 400 includes an example information element 402. The example information element 402 defines PUCCH-ConfigDedicated-V13. In the illustrated example, the information element 402 specifies a 6-bit bitmap that may be used to indicate a PUCCH resource allocation.

Figure 5:
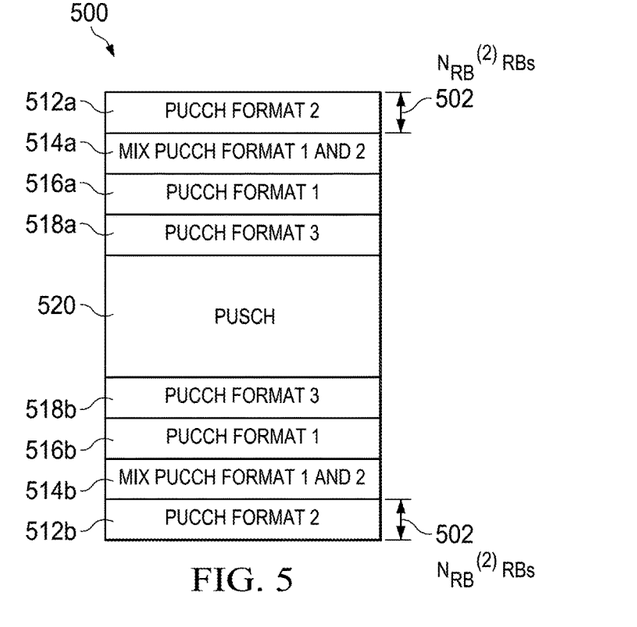
FIG. 5 is an example configuration for PUCCH transmissions.

FIG. 5 is a schematic 500 illustrating one example configuration for PUCCH transmissions. In a LTE system, a UE transmit PUCCH on both sides of PUSCH. In the illustrated example, the UE uses resource blocks 520 to transmit a PUSCH. The UE uses resource blocks 512a-b, 514a-b, 516a-b, and 518a-b to transmit PUCCHs. In the illustrated example, the eNB uses a parameter $N_{RB}^{(2)}$ 502 to configure the starting point of the resource blocks for PUCCH format 1. In the illustrated example, the starting point of the resource blocks for PUCCH format 1 transmission is $N_{RB}^{(2)}$ number of resource blocks away from the transmission bandwidth edge. For example, the UE may use the resource blocks 512a-b to transmit PUCCH format 2. The UE may also use the resource blocks 514a-b to transmit mixed PUCCH format 1 & 2, and the resource blocks 516a-b to transmit PUCCH format 1. The eNB may configure the parameter $N_{RB}^{(2)}$ 502 semi-statically. For example, the eNB may transmit the parameter $N_{RB}^{(2)}$ 502 in a broadcast message so that all the UEs in the cell may use the same resource blocks to transmit PUCCH format 1. In the illustrated example, the UE transmit PUCCH format 3 in the resource blocks 518a-b. The resource blocks 518a is located between the resource block 520 and the resource block 516a. Similarly, the resource blocks 518b is located between the resource block 520 and the resource block 516b. Placing PUCCH format 3 inside the allocation for PUCCH format 1 may provide one or more advantages. For example, as described previously, a UE may use format 3 to transmit HARQ bits in some subframes, and use format 1 to transmit HARQ bits in some other subframes. An eNB may configure the parameter $N_{RB}^{(2)}$ 502 semi-statically and a legacy UE may continue to use the parameter $N_{RB}^{(2)}$ 502 to determine which resource blocks the legacy UE may use for PUCCH format 2 and PUCCH format 1 transmission, respectively.

Figure 6:
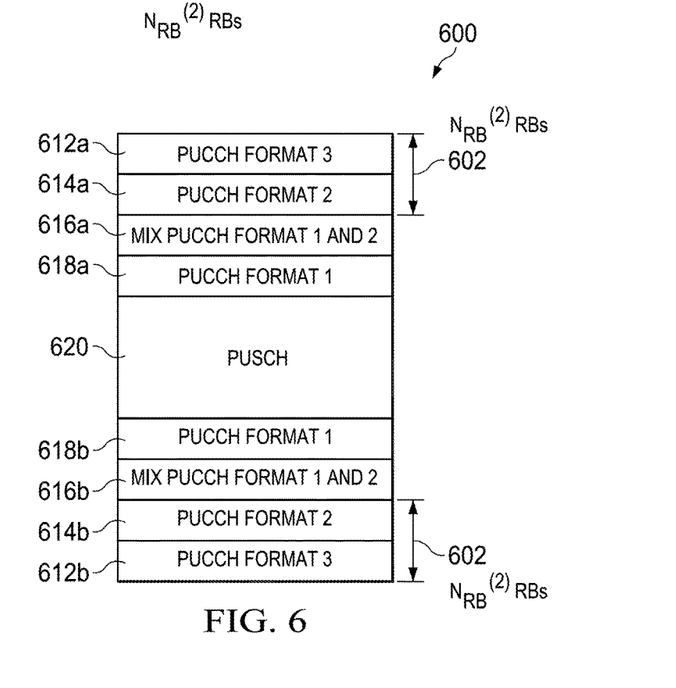
FIG. 6 is an example configuration for PUCCH transmissions.

FIG. 6 is a schematic 600 illustrating one example configuration for PUCCH transmissions. In the illustrated example, the UE uses resource blocks 620 to transmit a PUSCH. The UE uses resource blocks 612a-b, 614a-b, 616a-b, and 618a-b to transmit PUCCH. In the illustrated example, the eNB uses a parameter $N_{RB}^{(2)}$ 602 to configure the starting point of the resource blocks for PUCCH format 1. In the illustrated example, the starting point of the resource blocks for PUCCH format 1 transmission is $N_{RB}^{(2)}$ number of resource blocks away from the transmission bandwidth edge. For example, the UE may use the resource blocks 616a-b to transmit mixed PUCCH format 1 & 2, and the resource blocks 618a-b to transmit PUCCH format 1. In the illustrated example, the resource blocks 612a-b, which the UE may use to transmit PUCCH format 3, are located at the band edge. The resource blocks 612a-b are thus outside of the resource blocks 614a-b, which the UE may use to transmit PUCCH format 2. This approach has one or more advantages. For example, the resource blocks at band edge may provide a better signal quality. PUCCH format 3 may be used to transmit a large number of HARQ bits and may be less resilient to noise and interference. Therefore, using the resource blocks at band edge to transmit PUCCH format 3 may improve the signal quality of PUCCH format 3 and improve system performance.

As described previously, in some implementations, a UE may use format 3 to transmit HARQ bits in some subframes. Therefore an eNB may transmit a resource block allocation that includes two $N_{RB}^{(2)}$ parameters. The eNB may use one $N_{RB}^{(2)}$ to indicate the starting point of resource allocation for PUCCH format 1 in the subframes where a UE may use PUCCH format 3 to transmit HARQ bits, and use the other $N_{RB}^{(2)}$ to indicate the starting point of resource allocation for PUCCH format 1 in the subframes where a UE does not use PUCCH format 3 to transmit HARQ bits. These parameters needs to be delivered to the UE via the RRC messages, and may be updated from time to time.

Figure 7:
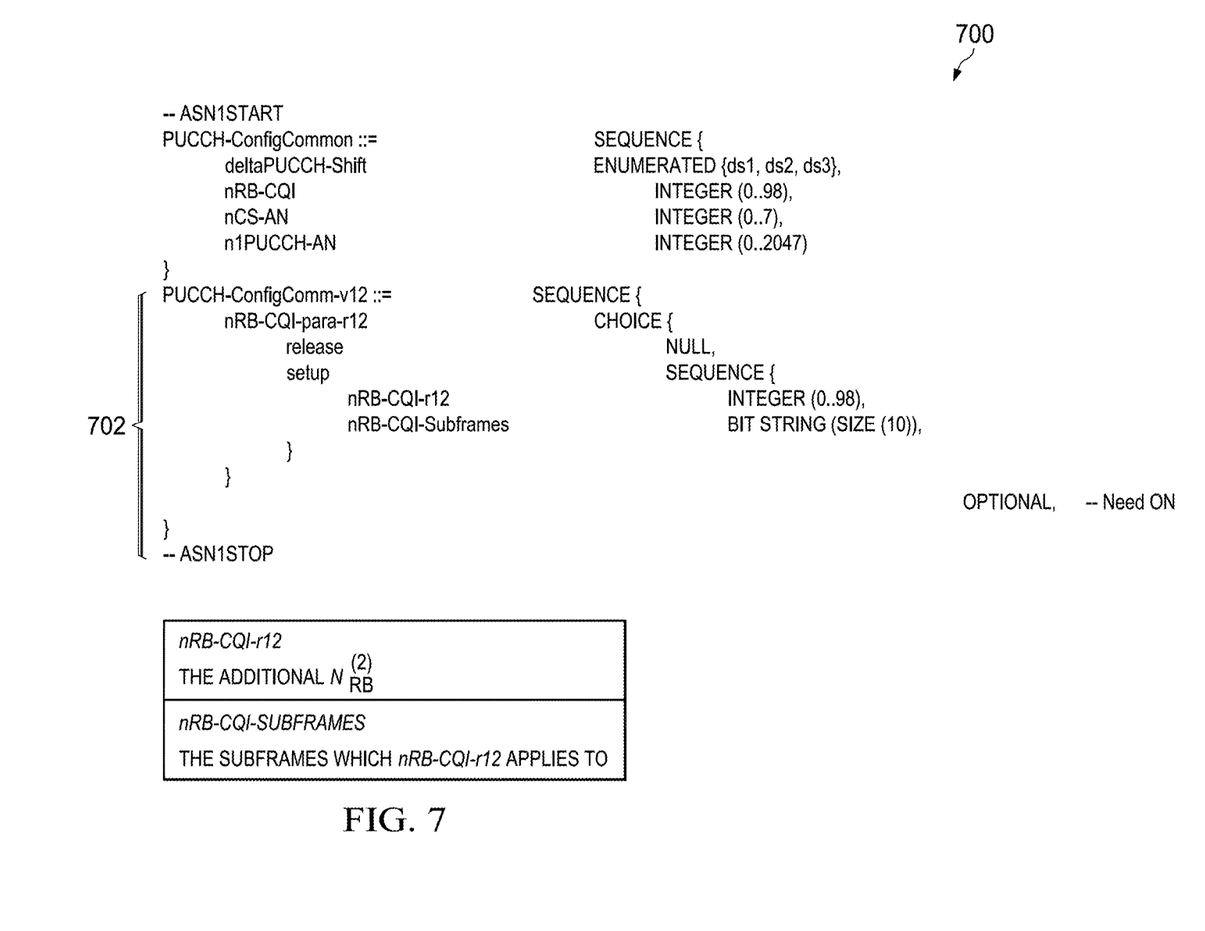
FIG. 7 is an example information element definition for an additional $N_{RB}^{(2)}$ parameter.

FIG. 7 is an example information element definition 700 specifying an additional $N_{RB}^{(2)}$ parameter. The example information element definition 700 includes an example information element 702. The example information element 702 defines PUCCH-ConfigComm-v12. In the illustrated example, the information element 702 includes an nRB-CQI-r12 value to specify the additional $N_{RB}^{(2)}$ parameter. The information element 702 also includes an nRB-CQI-subframes value to specify the subframes that the additional $N_{RB}^{(2)}$ parameter applies to.

Figure 8:
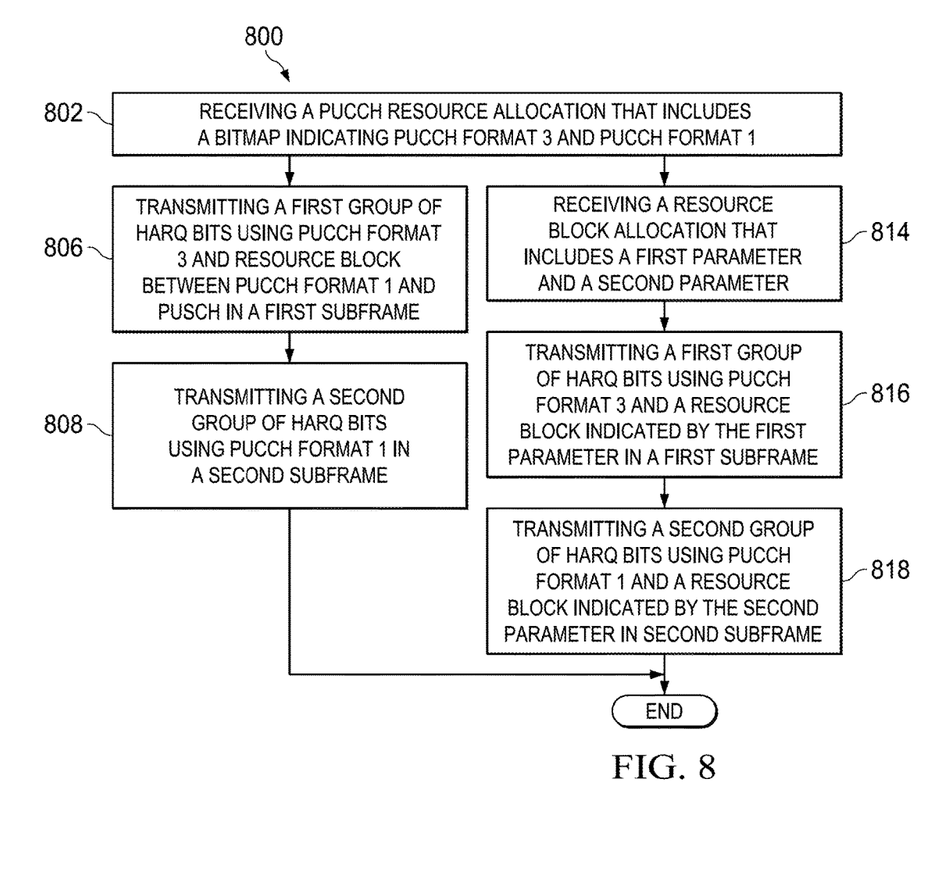
FIG. 8 is a flowchart illustrating a method for supporting TDD-FDD joint CA, according to one example of principles described herein.

FIG. 8 is a flowchart 800 showing an illustrative method for supporting TDD-FDD joint CA. The flowchart begins at step 802 where a UE receives a PUCCH resource allocation from an eNB. The PUCCH resource allocation may include a first PUCCH configuration for a first subframe and a second PUCCH configuration for a second subframe. In some implementations, the first PUCCH configuration indicates a first PUCCH format, and the second PUCCH configuration indicates a second PUCCH format. In some implementations, the PUCCH resource allocation may include a bitmap. For example, the bitmap may indicate a PUCCH format 3 for a first subframe and a PUCCH format 1 for a second subframe.

In some implementations, at step 806, the UE transmit a first group of HARQ bits using PUCCH format 3 in a first subframe as indicated by the bitmap. The first group of HARQ bits may include one or more HARQ bits corresponding to PDSCH transmissions on a TDD carrier and one or more HARQ bits corresponding to PDSCH transmissions on a FDD carrier. In some implementations, the UE may transmit the first group of HARQ bits in a resource block that is between resource blocks used to transmit PUCCH format 1 and resource blocks used to transmit PUSCH. At step 808, the UE transmits a second group of HARQ bits using PUCCH format 1 in a second subframe.

In some implementations, at step 814, the UE receives a resource block allocation. The resource block allocation may include a first parameter and a second parameter that is different than the first parameter. At step 816, the UE may transmit a first group of HARQ bits using PUCCH format 3 in a first subframe as indicated by the bitmap. The first group of HARQ bits may include one or more HARQ bits corresponding to PDSCH transmissions on a TDD carrier and one or more HARQ bits corresponding to PDSCH transmissions on a FDD carrier. In some implementations, the UE may transmit the first group of HARQ bits in a resource block indicated by the first parameter. At step 818, the UE transmits a second group of HARQ bits using PUCCH format 1 in a second subframe as indicated by the bitmap. The UE may transmit the second group of HARQ bits using a resource block indicated by the second parameter.

Figure 9:
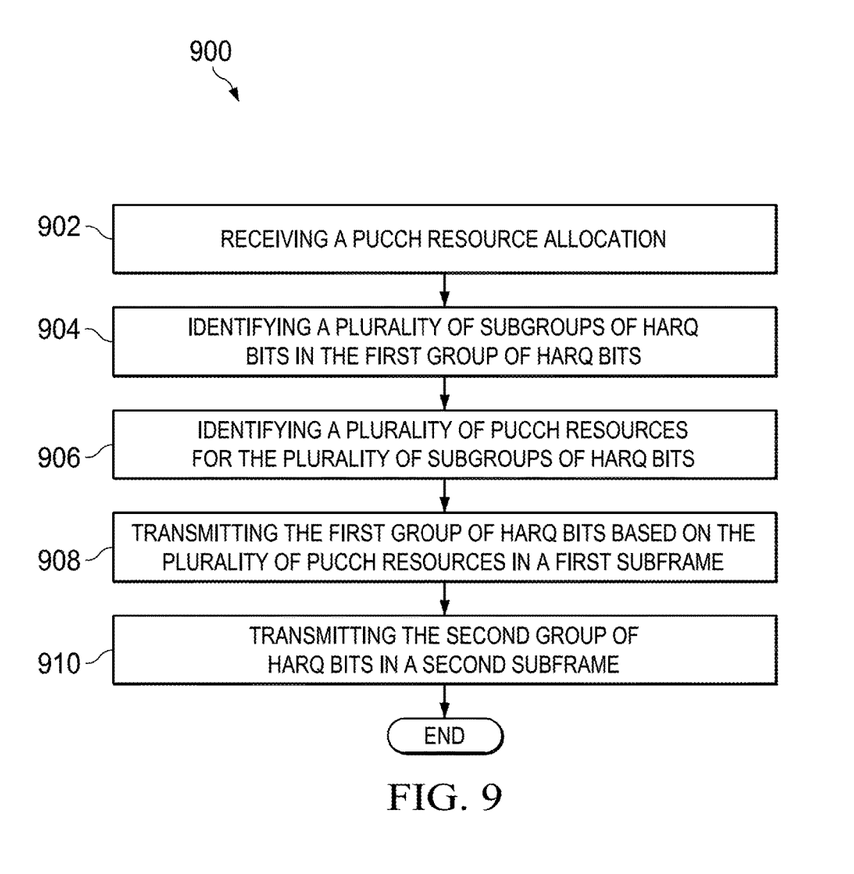
FIG. 9 is a flowchart illustrating a method for supporting TDD-FDD joint CA, according to one example of principles described herein.

In some implementations, an eNB may divide a first group of HARQ bits into several subgroups, and allocate PUCCH resources to each of the subgroups. FIG. 9 is a flowchart 900 showing an illustrative method for supporting TDD-FDD joint CA with multiple subgroups. The flowchart begins at step 902 where a UE receives a PUCCH resource allocation from an eNB. The PUCCH resource allocation may include a first PUCCH configuration for a first subframe and a second PUCCH configuration for a second subframe. In some implementations, the first PUCCH configuration may indicate the number of subgroups in the first group of HARQ bits.

At step 904, the UE identifies a plurality of subgroups in the first group of HARQ bits. For example, as described previously, in some subframes, the UE may transmit a first group of HARQ bits that includes six HARQ bits, while in other subframes, the UE may transmit a second group of HARQ bits that includes two HARQ bits. For the first group of HARQ bits, the eNB may divide the six HARQ bits into three subgroups and indicate such an allocation using the first PUCCH configuration. Accordingly, the UE identifies the three subgroups of HARQ bits. For the second group of HARQ bits, the eNB may allocate one subgroup and the UE may identify one subgroup of HARQ bits based on eNB's allocation.

At step 906, the UE identifies a plurality of PUCCH resources for the plurality of subgroups of HARQ bits. In some implementations, the eNB may allocate one PUCCH resource to each subgroup of HARQ bits. For example, the eNB may allocate three PUCCH resources for three subgroups of HARQ bits. Each PUCCH resource may be associated with one subgroup of HARQ bits. In some implementations, the plurality of PUCCH resources are consecutive. For example, if there are more than 20 ACK/NACK bits to be transmitted, the UE may use two PUCCH Format 3 resources. The eNB may configure the two PUCCH Format 3 resources such that the resource blocks used to transmit PUCCH format 3 are consecutive in frequency domain, e.g., PUCCH resources of index $n_{PUCCH}^{(3,\tilde{p})}$ and $n_{PUCCH}^{(3,\tilde{p})}+1$. This approach has one or more advantages. For example, this approach may reduce peak to average power ratio (PAPR) at the UE because the multiple PUCCH resources are in the same resource block or in the contiguous resource block.

At step 908, the UE transmits the first group of HARQ bits based on the plurality of PUCCH resources in a first subframe. For example, in a first subframe where the UE may transmit three subgroups of HARQ bits, the UE may use the three PUCCH resources associated with the three subgroups. At step 910, the UE transmits the second group of HARQ bits in a second subframe. For example, in a second subframe where the UE may transmit one subgroup of HARQ bits, the UE may use the one PUCCH resources associated with the one subgroup.

FIG. 10 is a schematic 1000 illustrating an example HARQ timing relationship on a TDD carrier with self-scheduling. The schematic 1000 includes a TDD carrier 1010 and a FDD UL 1020. In the illustrated example, an eNB configures a TDD-FDD joint CA for a UE. The eNB configures a FDD carrier having the FDD UL 1020 as a PCell and the TDD carrier 1010 as a SCell. The UE may therefore transmit HARQ bits corresponding to PDSCH transmissions on the TDD carrier 1010 on the FDD UL 1020. In the illustrated example, the eNB configures the TDD carrier 1010 as self-scheduling. The UE may receive a PDSCH assignment in subframe 0 on the TDD carrier 1010. The PDSCH assignment may indicate a PDSCH transmission for the TDD carrier 1010 in subframe 0. In the illustrated example, the UE transmits HARQ bits corresponding to PDSCH transmissions on the TDD carrier 1010 based on a FDD HARQ timing. For example, the UE receives a PDSCH transmission on the TDD carrier 1010 in subframe 0. Instead of using the TDD HARQ timing as described in Table 2, which means transmitting a corresponding HARQ bit in subframe 7, the UE transmits the corresponding HARQ bit in subframe. This approach reduces the round trip delay of a HARQ response, especially for PDSCH on subframe 0, 1, 5, and 6 in the illustrated example.

FIG. 11 is a schematic 1100 illustrating an example HARQ timing relationship on a TDD carrier with cross-carrier scheduling. The schematic 1100 includes a FDD DL 1102, a TDD carrier 1110, and a FDD UL 1120. Similarly as FIG. 10, the eNB configures a FDD carrier having the FDD DL 1102 and the FDD UL 1120 as a PCell and the TDD carrier 1110 as a SCell. The UE may therefore use the FDD UL 1120 to transmit HARQ bits corresponding to PDSCH transmissions on the TDD carrier 1110. In the illustrated example, the eNB configures the TDD carrier 1110 as cross-carrier scheduling. For example, the UE may receive a PDSCH assignment in subframe 0 on the FDD DL 1102. The PDSCH assignment may indicate a PDSCH transmission for the TDD carrier 1110 in subframe 0. In the illustrated example, the UE may transmit HARQ bits corresponding to PDSCH transmissions on the TDD carrier 1110 based on a FDD HARQ timing. For example, the UE may receive a PDSCH transmission on the TDD carrier 1110 in subframe 0. Instead of using the TDD HARQ timing as described in Table 2, which means transmitting a corresponding HARQ bit in subframe 7, the UE may transmit the corresponding HARQ bit in subframe 4.

FIG. 12 is a flowchart 1200 showing an illustrative method for transmitting HARQ bits based on FDD HARQ timing. The flowchart begins at step 1202 where a UE receives a TDD-FDD joint CA configuration. In the illustrated example, the TDD-FDD joint CA configuration includes a FDD carrier as a PCell and a TDD carrier as a SCell. In some implementations, the TDD carrier is configured as self-scheduling and at step 1204, the UE receives a PDSCH assignment for the TDD carrier on the TDD carrier. In some implementations, the TDD carrier is configured as cross-carrier scheduling, and at step 1206 the UE receives a PDSCH assignment for the TDD carrier on the FDD carrier. At step 1210, the UE receives a PDSCH transmission on the TDD carrier. At step 1212, the UE transmits a HARQ bit corresponding to the PDSCH transmission on the TDD carrier using a FDD HARQ timing.

In some implementations, an eNB may use a restrictive approach in configuring a TDD-FDD joint CA. In one example, an eNB may avoid configuring a TDD carrier as a PCell in a TDD-FDD joint CA. In another example, an eNB may configure a TDD carrier as a PCell in a TDD-FDD joint CA, and avoid using cross-carrier scheduling. This approach may enable all the subframes in a radio frame be utilized.

FIG. 13 is a flowchart 1300 showing an illustrative method for configuring a TDD-FDD joint CA using a restrictive approach. The flowchart begins at step 1302 where an eNB configures a TDD-FDD joint CA. The TDD-FDD joint CA may include a FDD carrier and a TDD carrier. In some implementations, the eNB may avoid configuring the TDD carrier as a PCell. Therefore at step 1304, the eNB configures a PCell using only the FDD carrier. In some implementations, the eNB may configure a TDD carrier as a PCell at step 1310. The eNB may avoid using cross-carrier scheduling. At step 1312, the eNB transmits scheduling assignments for the TDD carrier only on the TDD carrier.

A number of embodiments of the invention have been described. Nevertheless, it will be understood that various modifications may be made without departing from the spirit and scope of the invention. Accordingly, other embodiments are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable y one skilled in the art and could be made without departing form the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. In addition, the order of method steps are not implied by the order they appear in the claims.

What is claimed is:

1. A method, comprising:
receiving a PUCCH resource allocation from an evolved NodeB (eNB) for a radio frame that includes a first subframe and a second subframe, wherein the PUCCH resource allocation includes a first PUCCH configuration for transmitting Hybrid Automatic Repeat reQuest (HARQ) bits on a TDD carrier in the first subframe and a second PUCCH configuration for transmitting HARQ bits on the TDD carrier in the second subframe, and the second PUCCH configuration is different than the first PUCCH configuration, wherein the first PUCCH configuration indicates a first PUCCH format and the second PUCCH configuration indicates a second PUCCH format;
transmitting a first group of HARQ bits based on the first PUCCH configuration in the first subframe; and
transmitting a second group of HARQ bits based on the second PUCCH configuration in the second subframe.

2. A method of claim 1, wherein the PUCCH resource allocation is transmitted in a Radio Resource Control (RRC) message.

3. A method of claim 1, wherein the first group of HARQ bits includes one or more HARQ bits corresponding to PDSCH transmissions on the TDD carrier and one or more HARQ bits corresponding to PDSCH transmissions on a FDD carrier.

4. A method of claim 1, wherein the PUCCH resource allocation is a bitmap.

5. A method of claim 1, wherein the first PUCCH format is PUCCH format 3.

6. A method of claim 5, wherein the first group of HARQ bits are transmitted in a resource block that is between resource blocks used to transmit PUCCH format 1 and resource blocks used to transmit PUSCH.

7. A method of claim 5, further comprising:
receiving a resource block allocation, wherein the resource block allocation includes a first parameter and a second parameter that is different than the first parameter; and
wherein the transmission of the first group of HARQ bits is based on the first parameter and the transmission of the second HARQ bit is based on the second parameter.

8. A method of claim 1, further comprising:
identifying a plurality of subgroups of HARQ bits in the first group of HARQ bits;
identifying a plurality of PUCCH resources for the plurality of subgroups of HARQ bits; and
wherein the transmission of the first group of HARQ bits is based on the plurality of PUCCH resources.

9. A method of claim 8, wherein the plurality of PUCCH resources are consecutive.

10. A user equipment (UE), comprising:
one or more processors configured to:
receive a PUCCH resource allocation from an eNB, wherein the PUCCH resource allocation includes a first PUCCH configuration for transmitting Hybrid Automatic Repeat reQuest (HARQ) bits on a TDD carrier in the first subframe and a second PUCCH configuration for transmitting HARQ bits on the TDD carrier in the second subframe, and the second PUCCH configuration is different than the first PUCCH configuration, wherein the first PUCCH configuration indicates a first PUCCH format and the second PUCCH configuration indicates a second PUCCH format;
transmit a first group of HARQ bits based on the first PUCCH configuration in the first subframe; and
transmit a second group of HARQ bits based on the second PUCCH configuration in the second subframe.

11. An apparatus comprising instructions embodied on a tangible, non-transitory computer-readable medium, the instructions operable when executed to cause a computing system to perform operations comprising:
receiving a PUCCH resource allocation from an eNB, wherein the PUCCH resource allocation includes a first PUCCH configuration for transmitting Hybrid Automatic Repeat reQuest (HARQ) bits on a TDD carrier in a first subframe in a radio frame and a second PUCCH configuration for transmitting HARQ bits on the TDD carrier in a second subframe in the radio frame, and the second PUCCH configuration is different than the first PUCCH configuration, wherein the first PUCCH configuration indicates a first PUCCH format and the second PUCCH configuration indicates a second PUCCH format;
transmitting a first group of HARQ bits based on the first PUCCH configuration in the first subframe; and
transmitting a second group of HARQ bits based on the second PUCCH configuration in the second subframe.

* * * * *